(12) United States Patent
Sato

(10) Patent No.: US 12,100,122 B2
(45) Date of Patent: Sep. 24, 2024

(54) IMAGE PROCESSING APPARATUS FOR COMBINING A PLURALITY OF IMAGES, IMAGING APPARATUS, IMAGING METHOD, AND RECORDING MEDIUM

(71) Applicant: CANON KABUSHIKI KAISHA, Tokyo (JP)

(72) Inventor: Kazuki Sato, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/520,308

(22) Filed: Nov. 5, 2021

(65) Prior Publication Data

US 2022/0148142 A1 May 12, 2022

(30) Foreign Application Priority Data

Nov. 12, 2020 (JP) ................................. 2020-188453

(51) Int. Cl.
| | |
|---|---|
| *G06T 5/50* | (2006.01) |
| *G06T 5/92* | (2024.01) |
| *G06T 7/11* | (2017.01) |
| *H04N 23/71* | (2023.01) |
| *H04N 23/76* | (2023.01) |

(52) U.S. Cl.
CPC .................. *G06T 5/50* (2013.01); *G06T 5/92* (2024.01); *G06T 7/11* (2017.01); *H04N 23/71* (2023.01); *H04N 23/76* (2023.01); *G06T 2207/10148* (2013.01)

(58) Field of Classification Search
CPC ... G06T 5/50; G06T 5/009; G06T 7/11; G06T 2207/10148; G06T 5/008; G06T 5/92; G06T 5/94; H04N 23/71; H04N 23/76; H04N 23/80; H04N 5/265; H04N 23/54; H04N 23/50; H04N 23/55
See application file for complete search history.

(56) References Cited

U.S. PATENT DOCUMENTS

| | | | | |
|---|---|---|---|---|
| 2008/0024616 | A1* | 1/2008 | Takahashi | H04N 23/611 348/221.1 |
| 2008/0075384 | A1* | 3/2008 | Chung | G06T 5/008 382/274 |
| 2015/0005575 | A1* | 1/2015 | Kobayashi | A61B 1/045 600/103 |
| 2017/0200283 | A1* | 7/2017 | Yamaguchi | H04N 23/71 |
| 2018/0176475 | A1* | 6/2018 | Masamura | H04N 5/2628 |
| 2018/0182075 | A1* | 6/2018 | Sasaki | G06T 5/50 |
| 2019/0174073 | A1* | 6/2019 | Onuki | H04N 23/71 |

(Continued)

FOREIGN PATENT DOCUMENTS

| | | |
|---|---|---|
| JP | 2015216532 A | 12/2015 |
| JP | 2017-201745 | * 11/2017 |

*Primary Examiner* — Luong T Nguyen
(74) *Attorney, Agent, or Firm* — Canon U.S.A., Inc. IP Division

(57) ABSTRACT

An apparatus includes at least one memory configured to store instructions, and at least one processor coupled to the at least one memory and configured to execute the instructions to perform image composition of a plurality of images with different focus positions, calculate contrast-related values based on the plurality of images, generate a composition map based on the contrast-related values, divide a region based on subjects with respect to the plurality of images, and correct a gradation for the each region that has been divided.

18 Claims, 11 Drawing Sheets

(56) References Cited

U.S. PATENT DOCUMENTS

| | | | |
|---|---|---|---|
| 2019/0273857 A1* | 9/2019 | Hirata | G06T 5/008 |
| 2020/0242745 A1* | 7/2020 | Nashizawa | G06T 5/007 |
| 2020/0302597 A1* | 9/2020 | Lin | A61B 6/032 |

* cited by examiner

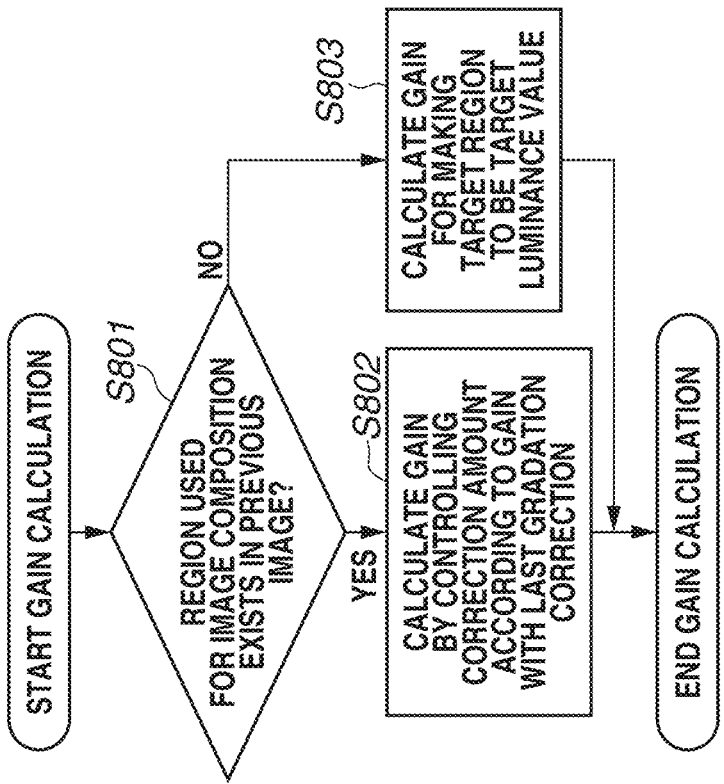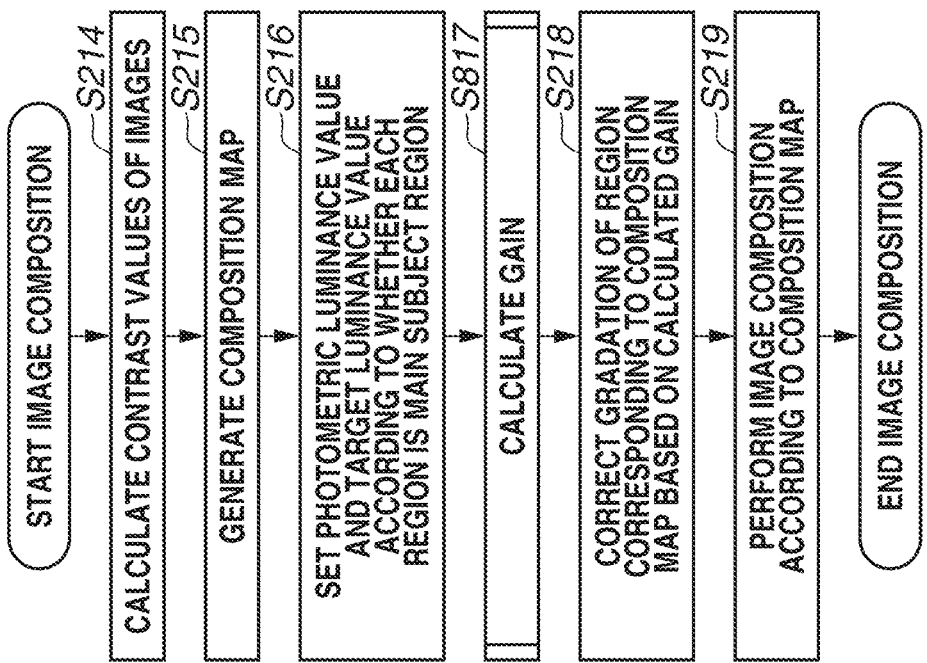

IMAGE PROCESSING APPARATUS FOR COMBINING A PLURALITY OF IMAGES, IMAGING APPARATUS, IMAGING METHOD, AND RECORDING MEDIUM

BACKGROUND OF THE DISCLOSURE

Field of the Disclosure

The aspect of the embodiments relates an image processing apparatus that captures a plurality of images with different focus positions and performs depth composition.

Description of the Related Art

In capturing images of a plurality of subjects at largely different distances from a digital camera or in capturing an image of a subject that is long in a depth direction, some of the subjects or a part of the long subject may be focused because of an insufficient depth of field. Japanese Patent Application Laid-Open No. 2015-216532 discusses a technique of depth composition that solves this issue. The depth composition technique captures a plurality of images with different focus positions, extracts an in-focus region from each image, and combines the in-focus regions into one image to generate a composite image in which the entire imaging region is focused.

The above-described depth composition technique generates an image in which the entire imaging region is focused, by composing a plurality of images with different focus positions. However, the technique does not determine whether the brightness of composed regions is suitable for a subject and thus does not necessarily provide the proper brightness to the subject.

SUMMARY OF THE DISCLOSURE

According to an aspect of the embodiments, an apparatus includes at least one memory configured to store instructions, and at least one processor coupled to the at least one memory and configured to execute the instructions to perform image composition of a plurality of images with different focus positions, calculate contrast-related values based on the plurality of images, generate a composition map based on the contrast-related values, divide a region based on subjects with respect to the plurality of images, and correct a gradation for the each region that has been divided.

Further features of the disclosure will become apparent from the following description of exemplary embodiments with reference to the attached drawings.

BRIEF DESCRIPTION OF THE DRAWINGS

FIGS. 8A and 8B are flowcharts illustrating image composition according to the second exemplary embodiment.

DESCRIPTION OF THE EMBODIMENTS

Exemplary embodiments of the disclosure will be described in detail below with reference to the accompanying drawings. The following exemplary embodiments do not limit the disclosure within the ambit of the appended claims. Not all of the combinations of the features described in the present exemplary embodiment are indispensable to the solutions for the disclosure.

Figure 1:
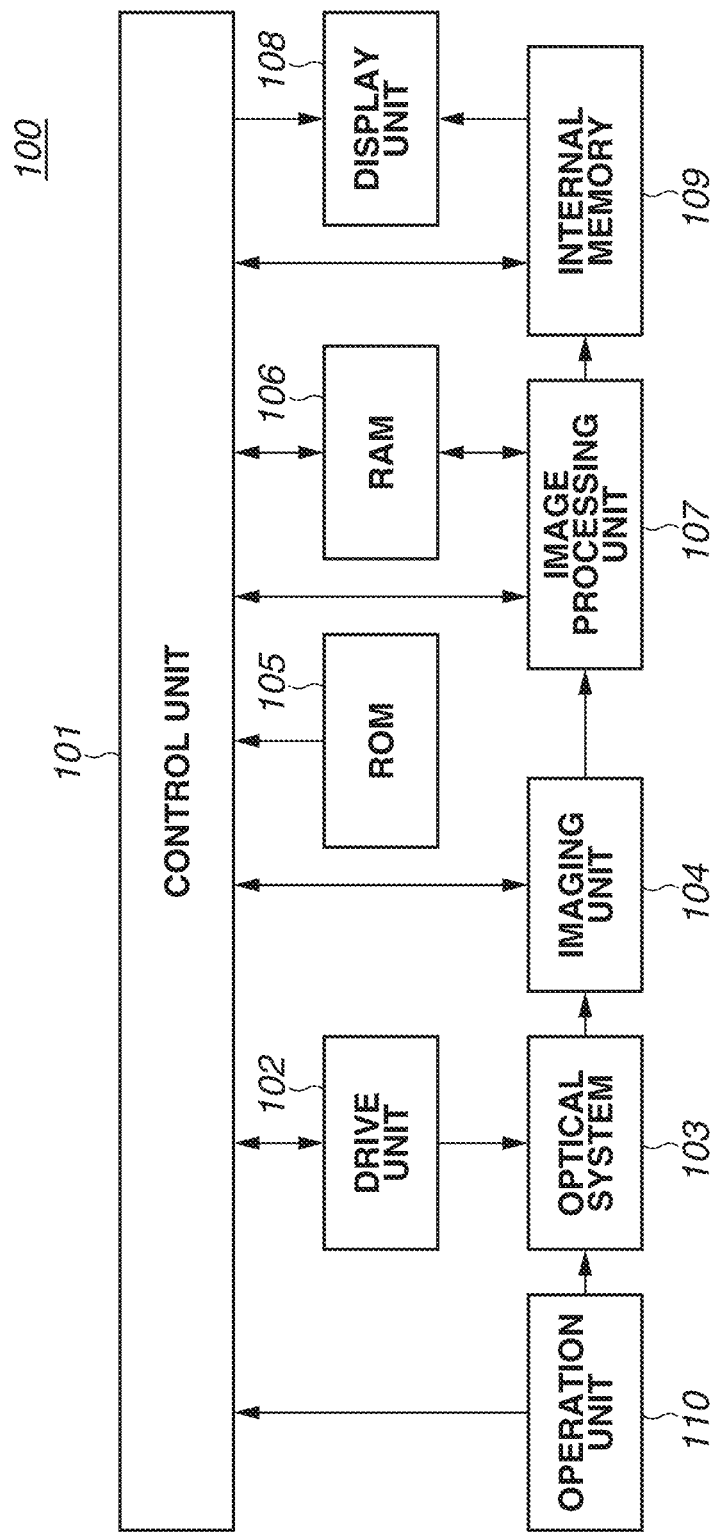
FIG. 1 is a block diagram illustrating a hardware configuration of a digital camera as an image processing apparatus according to exemplary embodiments of the disclosure.

FIG. 1 is an example block diagram illustrating a structure of a digital camera as an image processing apparatus according to a first exemplary embodiment. A digital camera 100 is capable of capturing a still image, recording information about a focusing position, calculating a contrast value, and performing image composition. The digital camera 100 is further capable of subjecting a captured and stored image or an externally input image to enlargement processing or reduction processing.

A control unit 101, which is a signal processor such as a central processing unit (CPU) and a micro processing unit (MPU), controls each portion of the digital camera 100 while reading a program prestored in a read only memory (ROM) 105 to be described below. For example, as described below, the control unit 101 issues an imaging start instruction and an imaging end instruction to an imaging unit 104 to be described below. Alternatively, the control unit 101 issues an image processing instruction to an image processing unit 107 to be described below based on a program stored in the ROM 105. A user instruction is input to the digital camera 100 via an operation unit 110 to be described below and then reaches each portion of the digital camera 100 via the control unit 101.

A drive unit 102 includes a motor and mechanically operates an optical system 103 to be described below under an instruction of the control unit 101. For example, based on an instruction of the control unit 101, the drive unit 102 moves a position of a focusing lens included in the optical system 103 to adjust a focal length of the optical system 103.

The optical system 103 includes a zoom lens, the focusing lens, and a diaphragm. The diaphragm is a mechanism that adjusts an amount of transmitting light. A focusing position can be changed by changing a lens position.

The imaging unit 104, which is a photoelectric conversion element, performs photoelectric conversion for converting a signal of incident light into an electrical signal. For example, a charge coupled device (CCD) sensor or a complementary metal oxide semiconductor (CMOS) sensor is applicable to the imaging unit 104. The imaging unit 104 having a moving image capturing mode is capable of capturing a plurality of images, which is temporally continuous, as frames of a moving image. The imaging unit 104 can perform photometric measurement on luminance of a subject via the optical system 103. An Acoustic Emission (AE) sensor can also be used instead of the photometric measurement by the imaging unit 104.

The ROM 105, which is a read only nonvolatile memory as a recording medium, stores parameters for an operation of each block in addition to an operation program of each block included in the digital camera 100.

A RAM 106, which is a rewritable volatile memory, is used as a temporary storage area for data output in an operation of each block included in the digital camera 100.

The image processing unit 107 subjects data of an image output from the imaging unit 104 or an image signal recorded in an internal memory 109 to be described below to white balance adjustment, color interpolation, filtering, composition processing, and other various image processing. The image processing unit 107 also subjects data of the image signal captured by the imaging unit 104 to compression processing conforming to the Joint Photographic Experts Group (JPEG) standard.

The image processing unit 107 includes an Application Specific Integrated Circuit (ASIC) that integrates circuits for specific processing. Alternatively, the control unit 101 can also serve as a part or whole of the functions of the image processing unit 107 by performing processing according to a program read from the ROM 105 by the control unit 101. In a case where the control unit 101 serves as all functions of the image processing unit 107, the image processing unit 107 does not need to be provided as a hardware component.

A display unit 108 is a liquid crystal display or an organic electroluminescence (EL) display for displaying an image temporarily stored in the RAM 106, an image stored in the internal memory 109 to be described below, or a setting screen of the digital camera 100.

The internal memory 109 is a location for recording an image captured by the imaging unit 104, an image processed by the image processing unit 107, and information about a focusing position at the time of image capturing. A memory card can be used instead of the internal memory.

The operation unit 110 includes, for example, a button, a switch, a key, and a mode dial provided on the digital camera 100, or a touch panel used also as the display unit 108. A user instruction is transmitted to the control unit 101 via the operation unit 110.

Figure 2A:
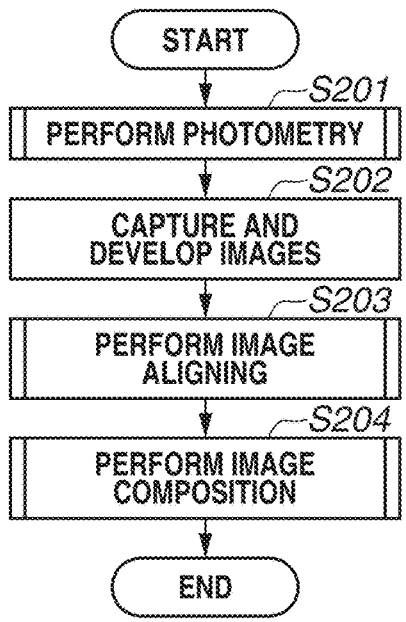
FIGS. 2A, 2B, 2C, and 2D are flowcharts illustrating generation of a composite image according to a first exemplary embodiment.
Figure 2B:
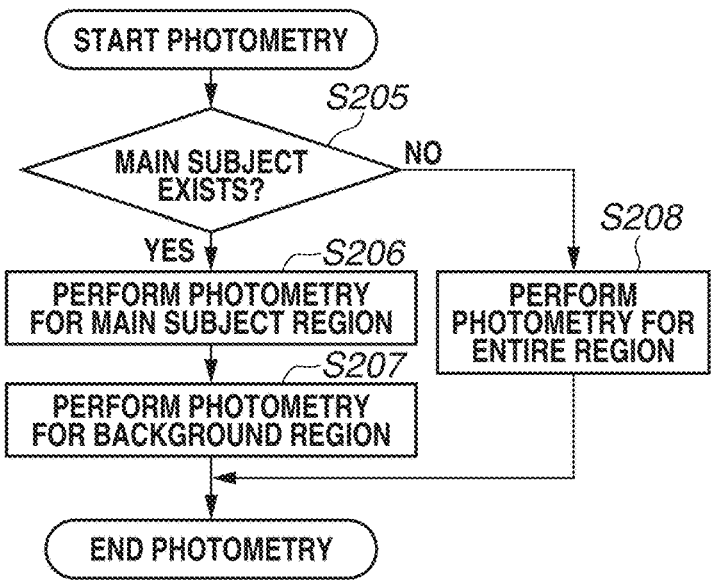

FIGS. 2A to 2D are flowcharts illustrating generation of a composite image according to the present exemplary embodiment. FIG. 2A illustrates an overview of processing according to the present exemplary embodiment. In step S201, the imaging unit 104 performs the photometric measurement on a subject that passed through the optical system 103. Photometric measurement processing will be described below.

In step S202, the imaging unit 104 captures a plurality of images with different focus positions and develops the images.

In step S203, the control unit 101 aligns the images captured by the imaging unit 104 in step S202. Alignment processing will be described below with reference to FIG. 2C.

In step S204, the image processing unit 107 subjects the aligned images to the image composition to generate a composite image. Image composition processing will be described below with reference to FIG. 2D.

Figure 3A:
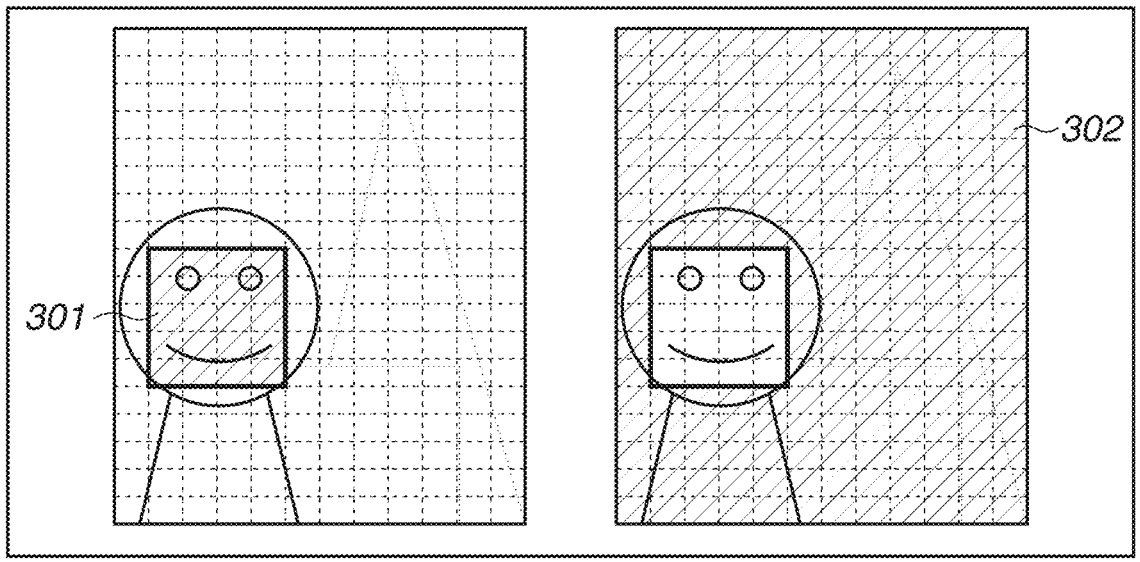
FIGS. 3A and 3B illustrate a region to be subjected to light metering in step S201 according to the first exemplary embodiment.
Figure 3B:
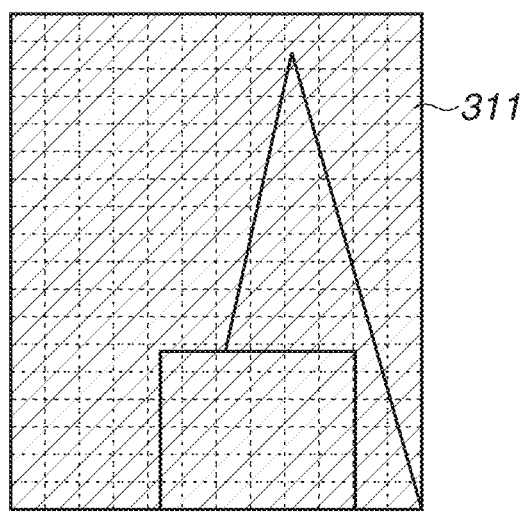

The photometric measurement processing will be described below with reference to FIGS. 3A and 3B. FIGS. 3A and 3B illustrate a region subjected to the photometric measurement in step S201 according to the present exemplary embodiment. FIG. 3A illustrates a photometric measurement region in a case where a main subject exists. A region 301 indicates the photometric measurement region of the main subject, and a region 302 indicates the photometric measurement region other than the photometric measurement region of the main subject. FIG. 3B illustrates a photometric measurement region in a case where no main subject exists. A region 311 indicates the photometric measurement region for an entire region independent of the main subject. In step S205 in the flowchart illustrated in FIG. 2B, the control unit 101 determines whether the main subject exists. In a case where the main subject exists as illustrated in FIG. 3A (YES in step S205), the processing proceeds to step S206. On the other hand, in a case where no main subject exists as illustrated in FIG. 3B (NO in step S205), the processing proceeds to step S208. In step S206, the control unit 101 performs the photometric measurement on the main subject region illustrated in the region 301. In step S207, the control unit 101 perform the photometric measurement on the non-main-subject region 302. In this case, the imaging unit 104 captures an image based on the result of the photometric measurement on the main subject. In step S208, the control unit 104 perform the photometric measurement on the entire region of the region 311. The photometric measurement region 301 of the main subject is used to determine the main subject region based on the image composition processing (described below). Luminance values obtained based on the result of photometric measurement on the main subject and the non-main-subject regions are used to calculate a gain for correcting the composition region in the image composition processing to be described below.

Figure 2C:
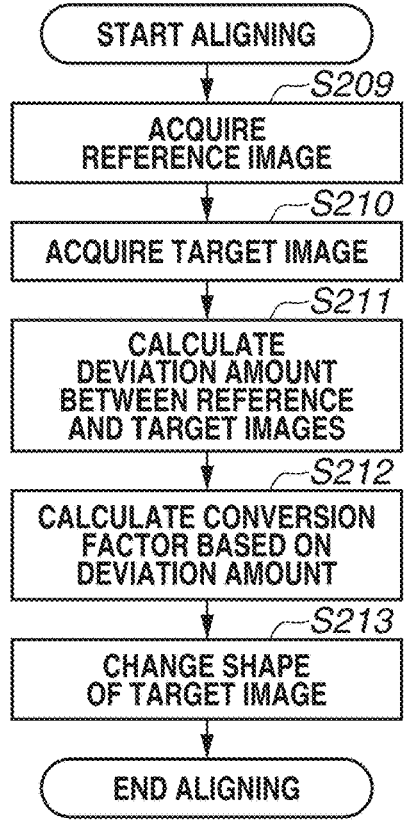

The alignment processing will be described below with reference to FIG. 2C. In step S209, the control unit 101 acquires a reference image for alignment from among the images captured by the imaging unit 104 in step S202. The reference image for alignment can be, for example, an image captured first. Alternatively, since image capturing with varying focus position slightly changes an angle of field between images, the reference image for alignment can be an image having the smallest angle of field out of the captured images.

In step S210, the control unit 101 acquires an alignment target image. The alignment target image is an image other than the reference image acquired in step S209 not having undergone the positioning processing. If the reference image for alignment is an image captured first, the control unit 101 is to sequentially acquire target images in order of image capturing.

In step S211, the control unit 101 calculates a positional deviation amount between the reference image and the target image. An example of a calculation method will be described below. Firstly, the control unit 101 sets a plurality of blocks to the reference image. In one embodiment, the control unit 101 sets the blocks so that each block has the same size. Then, at positions on the target image identical to respective blocks of the reference image, the control unit 101 sets a range wider than the block of the reference image, as a search range. Finally, the control unit 101 calculates a corresponding point where Sum of Absolute Difference (SAD) of the luminance from the block of the reference image is minimized in the search range of each target image. Based on the center of the block of the reference image and the above-described corresponding point, the control unit 101 calculates the positional deviation acquired in step S211, as a vector. In the calculation of the corresponding point described above, the control unit 101 can use Sum of Squared Difference (SSD) or Normalized Cross Correlation (NCC) in addition to SAD.

In step S212, the control unit 101 calculates a conversion factor based on the positional deviation amount between the reference image and the target image. The control unit 101 uses, for example, a projective conversion factor as the conversion factor. However, the conversion factor is not limited to the projective conversion factor, but can be an affine conversion factor or a simplified conversion factor with the horizontal and vertical shifts.

In step S213, the image processing unit 107 subjects the target image to the conversion using the conversion factor calculated in step S212.

For example, the control unit 101 can perform the conversion using Formula (1).

$$I' = \begin{pmatrix} x' \\ y' \\ 1 \end{pmatrix} = AI = \begin{pmatrix} a & b & c \\ d & e & f \\ g & h & i \end{pmatrix} \begin{pmatrix} x \\ y \\ 1 \end{pmatrix} \quad \text{Formula (1)}$$

In Formula (1), (x', y') denotes coordinates after the conversion, and (x, y) denotes coordinates before the conversion. A matrix A indicates the conversion factor calculated by the control unit 101 in step S212.

Figure 2D:
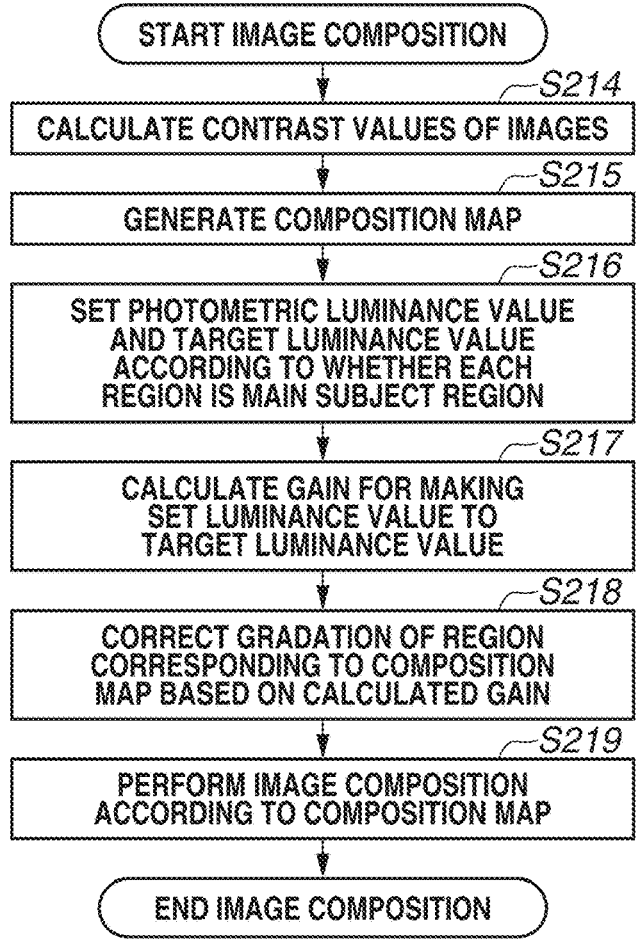

The image composition processing will be described below with reference to FIG. 2D. In step S214, the image processing unit 107 calculates a contrast value for each image (including the reference image) having undergone the alignment. As an example of a contrast value calculation method, the image processing unit 107 calculates luminance Y using Formula (2) based on Sr, Sg, and Sb color signals for each pixel.

$$Y = 0.299Sr + 0.587Sg + 0.114Sb \quad \text{Formula (2)}$$

Then, the image processing unit 107 calculates the contrast value I by applying a Sobel filter, as illustrated in the following Formulae (3) to (5), to a matrix L of the luminance Y of a 3×3 pixel.

$$I_h = \begin{pmatrix} -1 & 0 & 1 \\ -2 & 0 & 2 \\ -1 & 0 & 1 \end{pmatrix} \cdot L \quad \text{Formula (3)}$$

$$I_v = \begin{pmatrix} -1 & -2 & -1 \\ 0 & 0 & 0 \\ 1 & 2 & 1 \end{pmatrix} \cdot L \quad \text{Formula (4)}$$

$$I = \sqrt{I_h^2 + I_v^2} \quad \text{Formula (5)}$$

The above-described contrast value calculation method is to be considered as an example. Examples of usable filers include an edge-detection filter such as a Laplacian filter and a band-pass filter that passes a predetermined band.

In step S215, the image processing unit 107 generates a composition map. To generate a composition map, the image processing unit 107 compares the contrast values of pixels at the same position of respective images and calculates a composition ratio corresponding to the magnitudes of the contrast values.

In step S216, the image processing unit 107 determines whether each region of the image is the main subject region and sets a target luminance value. In step S216, the image processing unit 107 also performs region division of the main subject and the background subject based on the composition map. The region division will be described below with reference to the accompanying drawings.

Figure 4A:
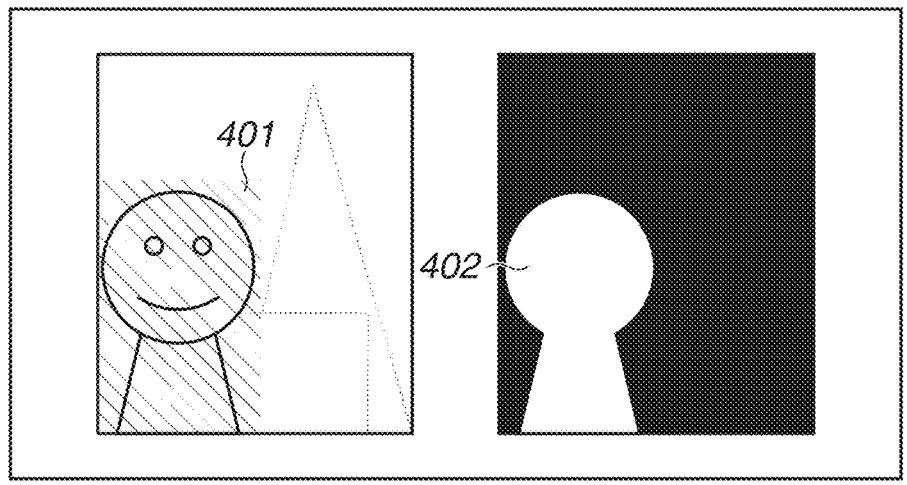
FIGS. 4A, 4B, and 4C illustrate generated composition maps corresponding to in-focus regions according to the first exemplary embodiment.
Figure 4B:
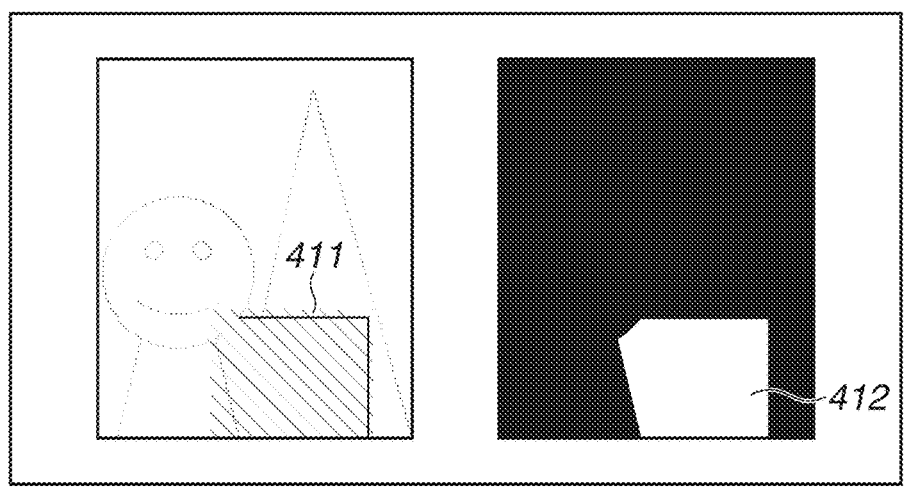
Figure 4C:
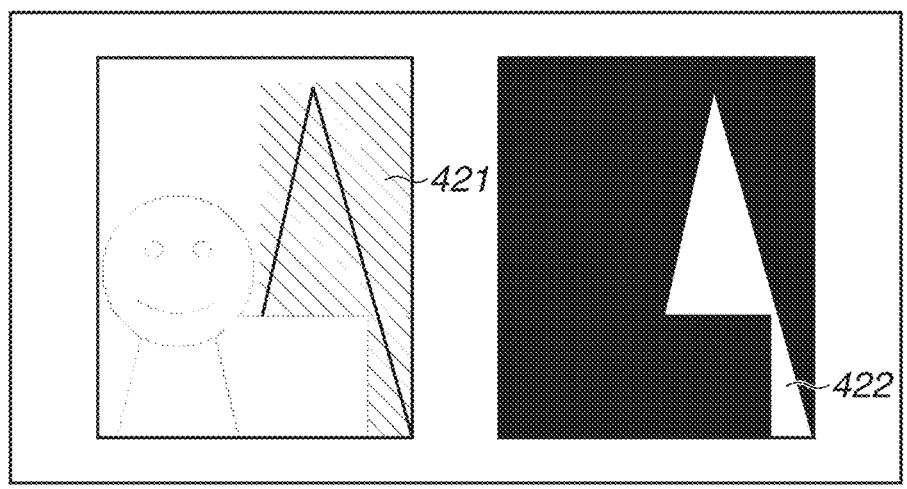
Figure 5A:
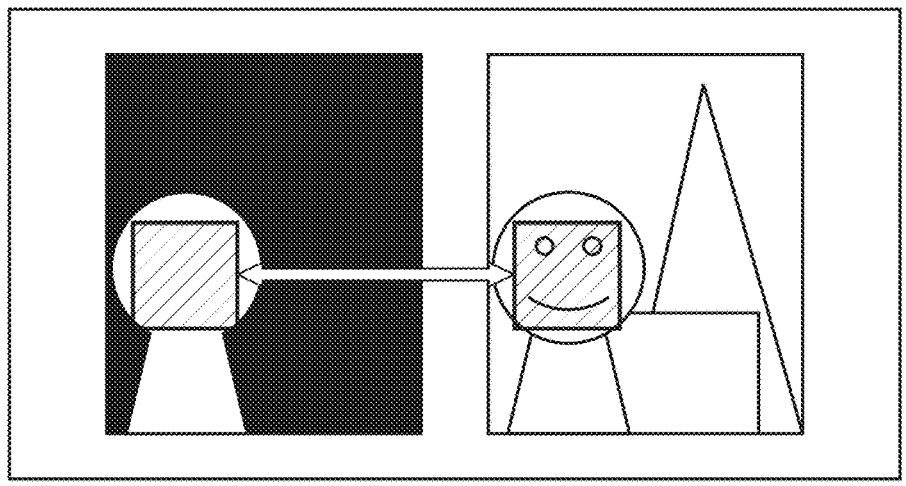
FIGS. 5A, 5B, and 5C illustrate subject region division according to the first exemplary embodiment.
Figure 5B:
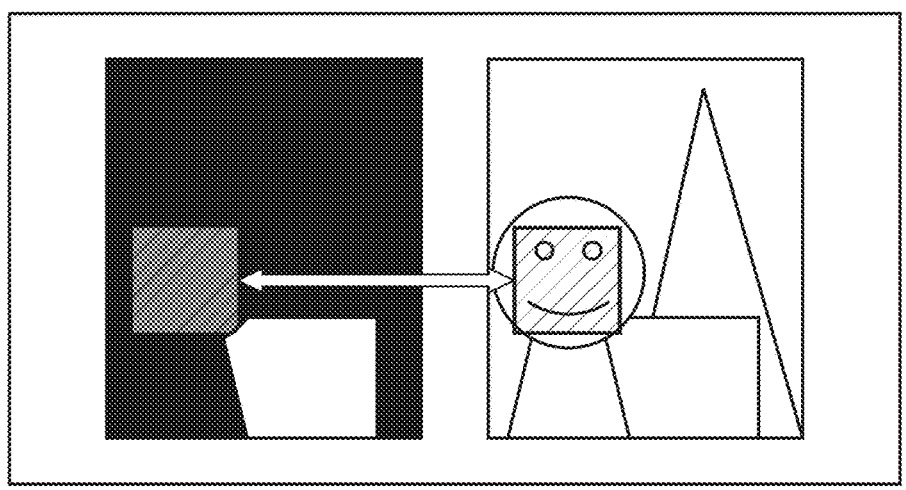
Figure 5C:
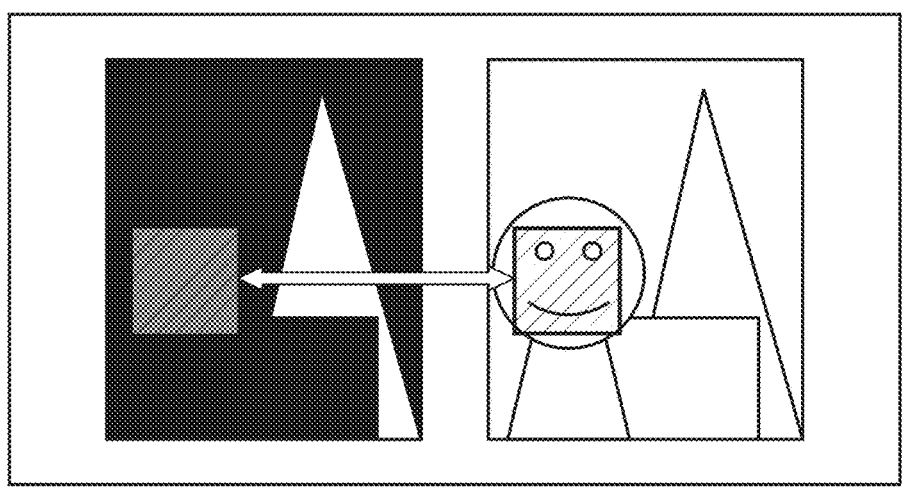

FIGS. 4A to 4C illustrate composition maps corresponding to an in-focus region, generated in step S215 according to the present exemplary embodiment. FIGS. 4A to 4C illustrate three different images captured with different focuses and composition maps generated by the three images. FIGS. 5A to 5C illustrate the region division of the subjects in step S216 according to the present exemplary embodiment.

In step S216, the control unit 101 determines whether the composition maps 402, 412, and 422 generated based on in-focus regions 401, 411, and 421, respectively, correspond to the photometric measurement region 301 of the main subject to determine whether each region is the main subject region. Then, the image processing unit 107 sets a photometric luminance value and a target luminance value according to whether each region is the main subject region. In a case where the composition map corresponds to the photometric measurement region of the main subject as illustrated in FIG. 5A, the image processing unit 107 sets the luminance value of the main subject region and the target luminance value of the main subject region obtained in the photometric measurement on the main subject region in step S206. On the other hand, in a case where the composition map does not correspond to the photometric measurement region of the main subject as illustrated in FIGS. 5B and 5C, the image processing unit 107 sets the luminance value obtained in the photometric measurement on the non-main-subject region in step S207 and the target luminance value for other regions than the photometric measurement region of the main subject. The target luminance value refers to a luminance value that provides proper brightness to a gradation of the photometric measurement region of the main subject and a gradation of other regions than the photometric measurement region of the main subject. In step S217, the image processing unit 107 calculates a gain for making the luminance value set in step S216 to be the target luminance value.

Based on the gain calculated in step S217, in step S218, the image processing unit 107 corrects the gradation of the region to be subjected to the image composition based on the composition map generated in step S215.

Figure 6A:
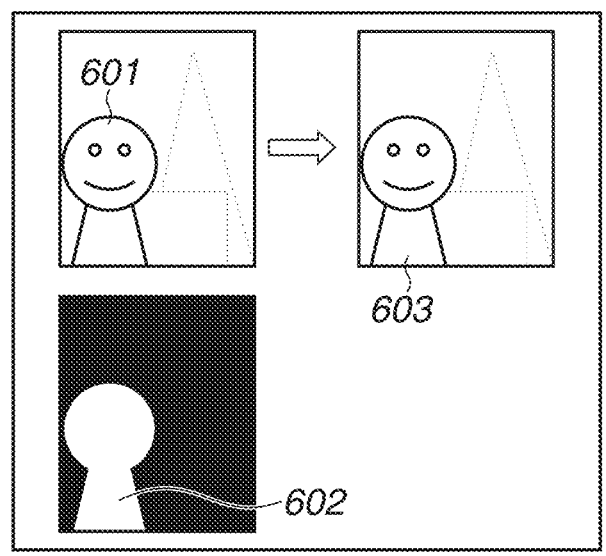
FIGS. 6A, 6B, and 6C illustrate correction by a gain according to the first exemplary embodiment.
Figure 6B:
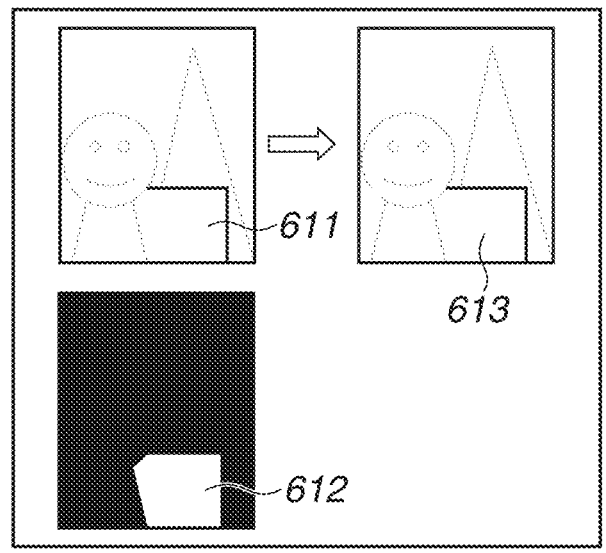
Figure 6C:
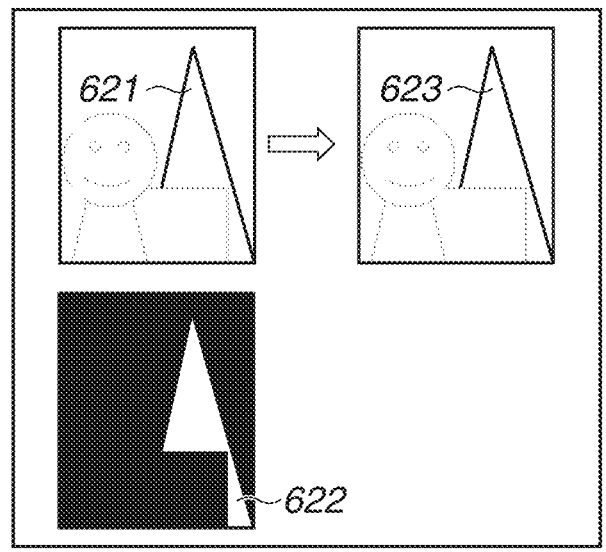

FIGS. 6A to 6C illustrate the correction based on the gain according to the present exemplary embodiment.

In a case illustrated in FIG. 6A where the composition map corresponds to the photometric measurement region of the main subject, the control unit 101 can correct a region 601 subjected to the image composition based on a composition map 602, based on the gain that provides the proper brightness to the main subject. In cases illustrated in FIGS. 6B and 6C where each composition map does not correspond to the photometric measurement region of the main subject, the control unit 101 can correct regions 611 and 621 subjected to the image composition based on composition maps 612 and 622, respectively, based on the gain that provides the proper brightness to the non-main-subject region.

In step S219, the image processing unit 107 performs image composition of the regions 603, 613, and 623 corrected in step S218 according to the composition maps 602, 612, and 622, respectively.

In the above descriptions, the control unit 101 performs the region division for the main subject and the background subject based on the composition maps, but the disclosure is not limited thereto. The control unit 101 can perform the region division for the main subject and the background subject based on the contrast value.

The first exemplary embodiment makes it possible, when generating a depth composite image, to improve the gradation to provide the proper brightness to each region to be subjected to the image composition.

A second exemplary embodiment will be described below with reference to the accompanying drawings. Unlike the first exemplary embodiment, the second exemplary embodiment can perform the correction with different gains even in the same subject region. The second exemplary embodiment will be described below centering on differences from the first exemplary embodiment.

FIGS. 7A to 7E illustrate imaging scenes and corrections according to the second exemplary embodiment.

Photometric measurement, image capturing, development, and alignment according to the present exemplary embodiment are similar to those according to the first exemplary embodiment. The image composition according to the present exemplary embodiment is different from that according to the first exemplary embodiment. FIGS. 8A and 8B are flowcharts illustrating the image composition according to the present exemplary embodiment. Step S817 in the flowchart illustrated in FIG. 8A according to the present exemplary embodiment is different from step S217 according to the first exemplary embodiment. The image composition will be described in detail below.

Figure 7A:
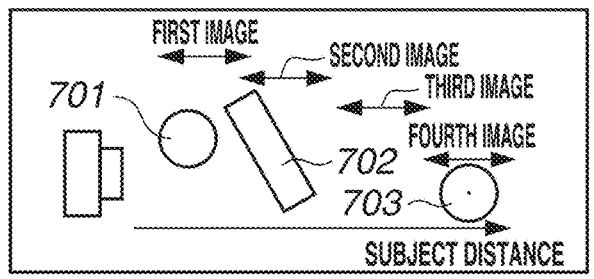
FIGS. 7A, 7B, 7C, 7D, and 7E illustrate an imaging scene and correction according to a second exemplary embodiment.
Figure 7B:
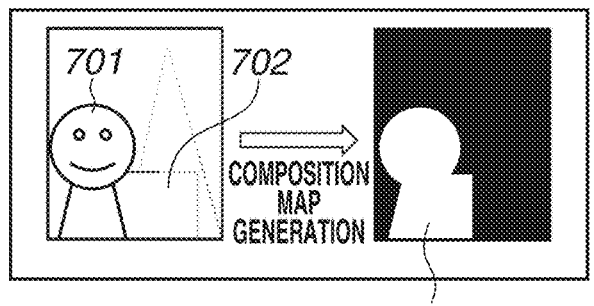
Figure 7C:
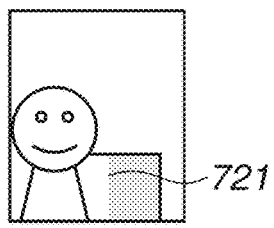
Figure 7D:
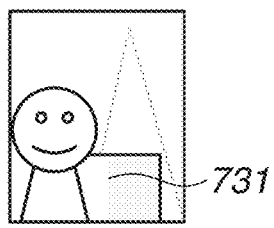
Figure 7E:
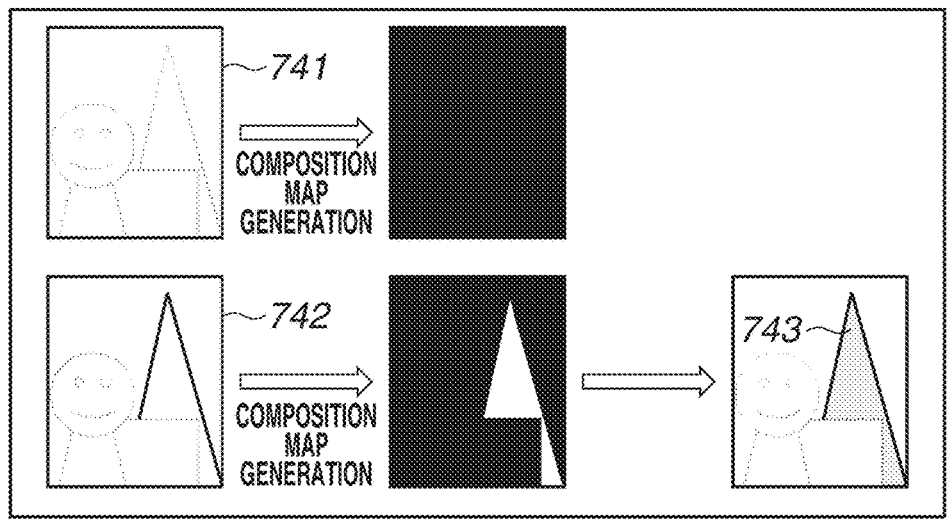

In a case where a distance between a main subject 701 and a background subject 702 is short, as illustrated in FIG. 7A, the main subject 701 and a part of the background subject 702 may be generated as a composition map 711, as illustrated in FIG. 7B, in step S215. In this case, the gradation is corrected with a gain calculated based on different target luminance values for the same background subject 702. Accordingly, a luminance difference 721 appears between captured images of the main subject 701 and the background subject 702, as illustrated in FIG. 7C. Unlike the first exemplary embodiment, the present exemplary embodiment suppresses the luminance difference in the same subject by changing the gain calculation method depending on a condition in gain calculation in step S817.

FIG. 8B is a flowchart illustrating the gain calculation according to the present exemplary embodiment. In step S801, the control unit 101 determines whether the region used in the image composition exists in the image preceding the image currently being processed. In a case where the region used in the image composition exists in the preceding image (YES in step S801), the control unit 101 determines that a luminance difference may arise in the same subject when the gain for making the target region to be the target luminance value is calculated like the first exemplary embodiment. In this case, the processing proceeds to step S802. In step S802, the image processing unit 107 calculates the gain by controlling a correction amount according to the gain with the last gradation correction. In the image illustrated in FIG. 7D as a result of the image composition of the first and the second captured images in the imaging scene illustrated in FIG. 7A, a steep luminance difference in the same subject can be suppressed as in a region 731. On the other hand, in a case where the region used in the image composition does not exist in the preceding image (NO in step S801), the processing proceeds to step S803. In step S803, the image processing unit 107 performs processing in a similar way to the first exemplary embodiment. This eliminates the need of controlling the correction amount according to the gain with the last gradation correction for the image including no subject to be focused, as in a third image 741 captured in the imaging scene illustrated in FIG. 7A. Since the third image 741 is not used in the image composition for a fourth captured image 742, the control unit 101 calculates a gain for correcting up to the target luminance value.

According to the present exemplary embodiment, the control unit 101 can change the gain calculation method to suppress a steep luminance difference due to different gains in the same subject region.

A third exemplary embodiment will be described below with reference to the accompanying drawings. Unlike the first and the second exemplary embodiments, the third exemplary embodiment will be described below regarding processing performed when a plurality of in-focus subjects exists in the same image. The third exemplary embodiment will be described below centering on the differences from the first exemplary embodiment.

FIGS. 9A to 9D illustrate imaging scenes and correction according to the third exemplary embodiment.

Figure 10A:
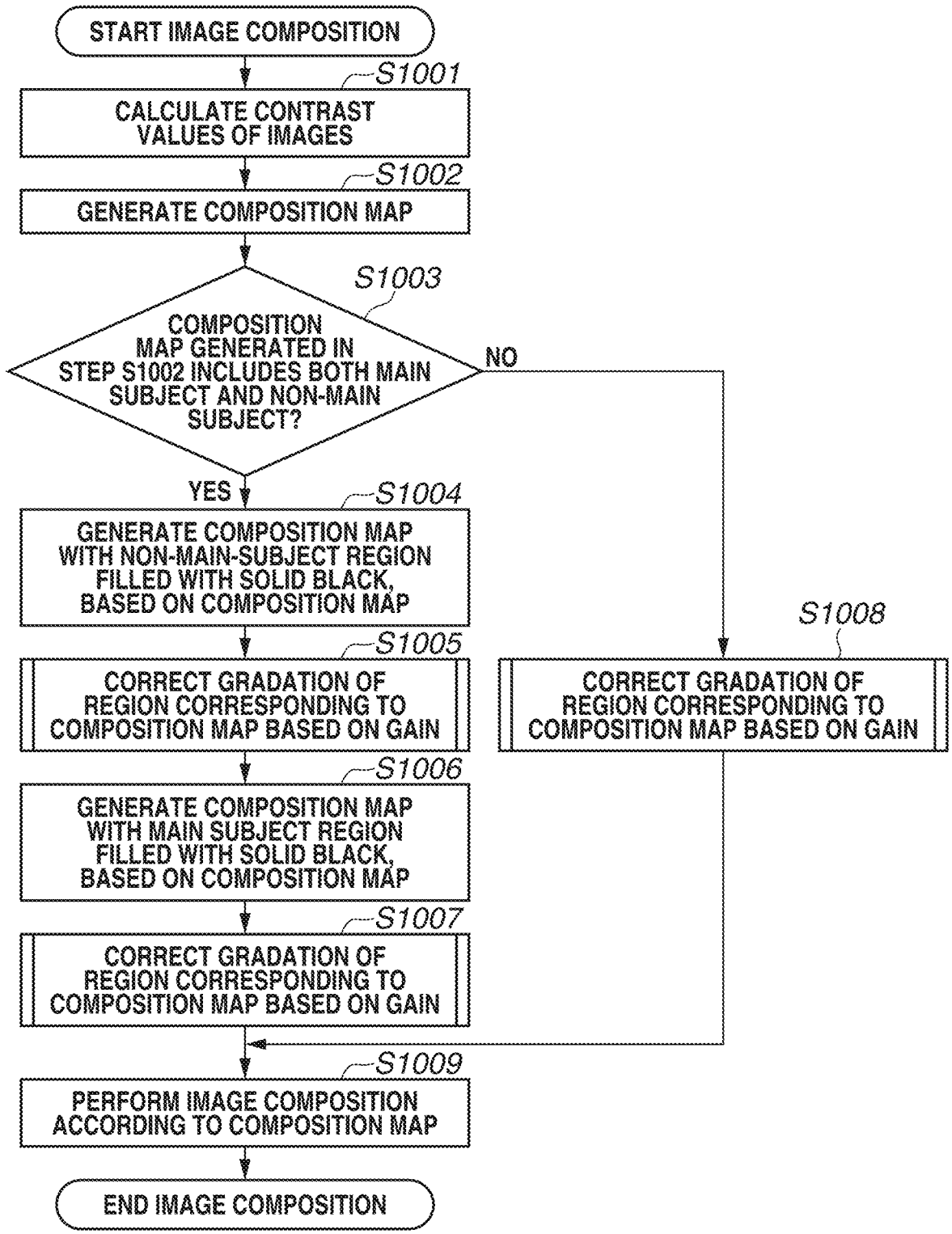
FIGS. 10A and 10B are flowcharts illustrating image composition according to the third exemplary embodiment.
Figure 10B:
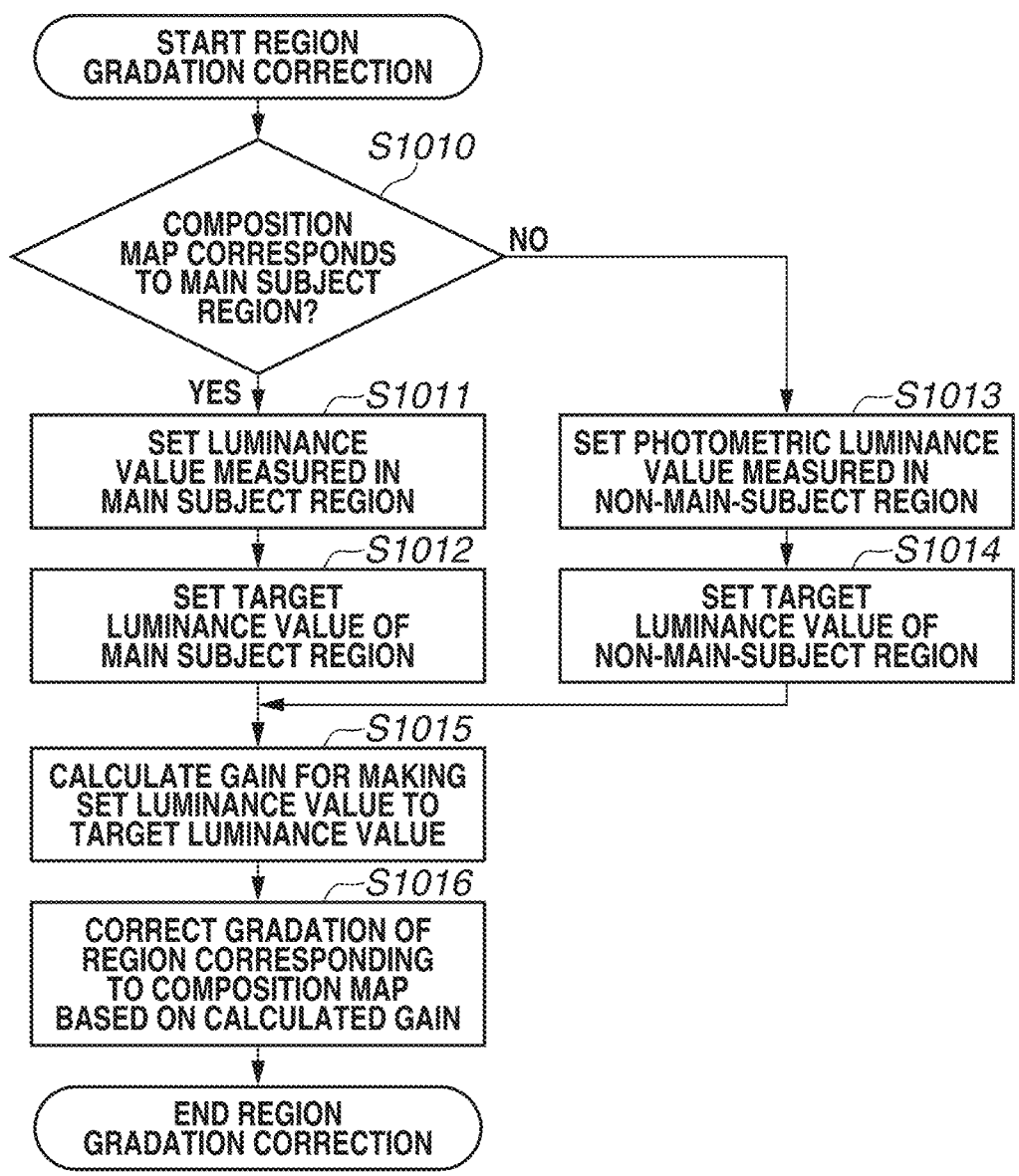

Photometric measurement, image capturing, development, and alignment according to the present exemplary embodiment are similar to those according to the first exemplary embodiment. The image composition according to the present exemplary embodiment is different from that according to the first exemplary embodiment. FIGS. 10A and 10B are flowcharts illustrating the image composition according to the present exemplary embodiment.

Figure 9A:
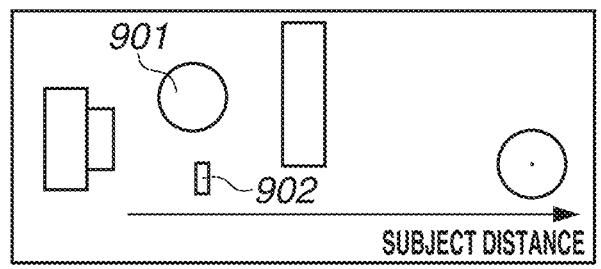
FIGS. 9A, 9B, 9C, and 9D illustrate an imaging scene and correction according to a third exemplary embodiment.
Figure 9B:
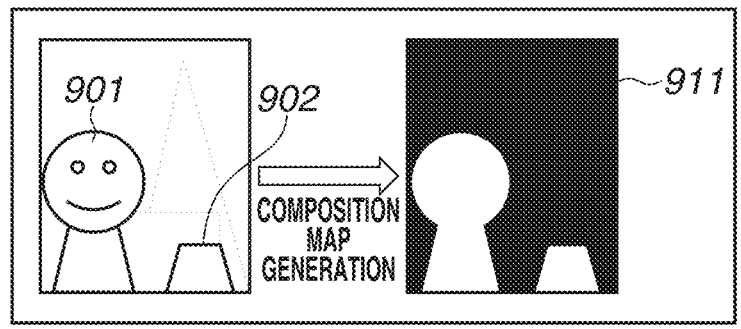

In the image capturing illustrated in FIG. 9A, a main subject 901 and a subject 902 different from the main subject 901 exist at a close distance. In the method according to the first exemplary embodiment in a case illustrated in FIG. 9A, a main subject and a subject different from the main subject may be generated as a composition map 911, as illustrated in FIG. 9B, in step S215. In this case, a region of the subject different from the main subject will be corrected based on the gain for making the main subject region to be the target luminance in step S218. A case where a condition is added before step S216 will be described below. In a case where a composition map includes a main subject region and a non-main-subject region, the control unit 101 generates a composition map where other regions than the region corresponding to the main subject are painted and a composition map where the region corresponding to the main subject is painted, and performs the correction based on the gain.

In steps S1001 and S1002 according to the present exemplary embodiment, the control unit 101 performs similar processing to that in steps S213 and S214, respectively, according to the first exemplary embodiment.

Figure 9C:
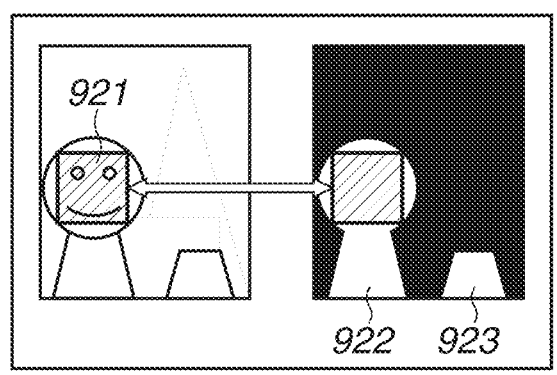
Figure 9D:
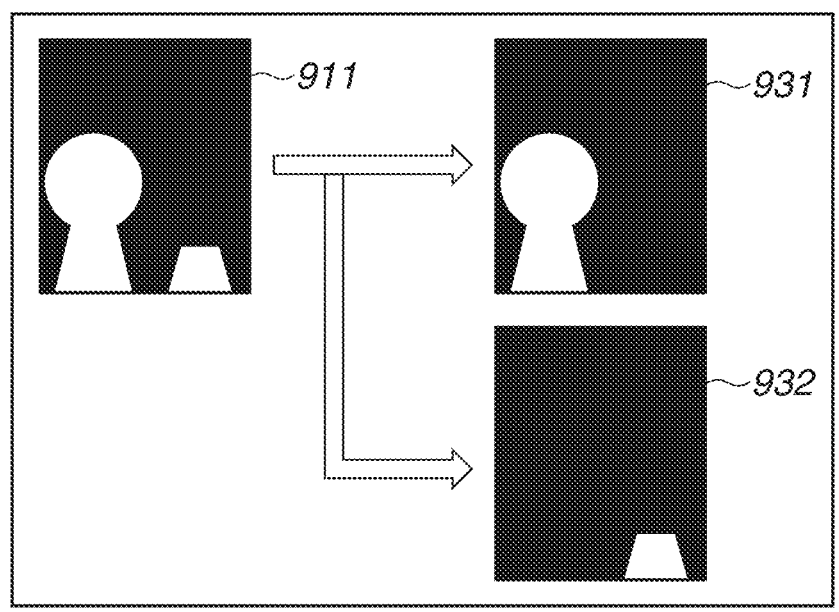

In step S1003, the control unit 101 determines whether the composition map generated in step S1002 includes both the main subject region and the non-main-subject region. Object recognition based on Convolutional Neural Network (CNN) is an example of a method for determining whether a composition map includes both the main subject and the non-main-subject regions. FIG. 9C illustrates a composition map that includes both a main subject 922 and a non-main-subject region 923. In the case of the composition map in FIG. 9C, the processing proceeds to step S1004. The control unit 101 generates a composition map 931 where other regions than the image composition region corresponding to the main subject region are painted, as illustrated in FIG. 9D, based on the composition map 911 generated in step S1002. In step S1005, the image processing unit 107 corrects the gradation of the region corresponding to the composition map 931 generated in step S1004.

In step S1006, the control unit 101 generates a composition map 932 where the image composition region corresponding to the main subject region is painted, based on the composition map 911 generated in step S1002. In step S1007, the image processing unit 107 corrects the gradation of the region corresponding to the composition map 932 generated in step S1006.

In a case where the control unit 101 determines that the composition map 911 generated in step S1002 includes neither the main subject region nor the non-main-subject region (NO in step S1003), the processing proceeds to step S1008. In step S1008, the control unit 101 corrects the gradation of the region corresponding to the composition map 911 generated in step S1002.

In step S1009, the image processing unit 107 performs image composition of the regions having undergone the region gradation correction based on the composition map 911 generated in step S1002, like in step S219 according to the first exemplary embodiment.

The region gradation correction in steps S1005, S1007, and S1008 will be described below. FIG. 10B is a flowchart illustrating the region gradation correction according to the present exemplary embodiment.

In step S1010, the control unit 101 determines whether the composition map as a processing target corresponds to the main subject region. In a case where the composition map as a processing target corresponds to the main subject region (YES in step S1010), the processing proceeds to step S1011. On the other hand, in a case where the composition map as a processing target does not correspond to the main subject region (NO in step S1010), the processing proceeds to step S1013.

In step S1011, the image processing unit 107 sets a photometric luminance value measured in the main subject region. In step S1012, the image processing unit 107 sets a target luminance value of the main subject region. In step S1013, the image processing unit 107 sets a photometric luminance value measured in the non-main-subject region. In step 1014, the image processing unit 107 sets a target luminance value of the non-main-subject region. The target luminance value in this case is similar to that according to the first exemplary embodiment, and is a luminance value that provides proper gradation to the photometric measurement region of the main subject or the photometric measurement region of the non-main-subject.

In step S1015, the image processing unit 107 calculates a gain for making the set luminance value to be the set target luminance value, like in step S217 according to the first exemplary embodiment.

In step S1016, the image processing unit 107 corrects the gradation of the region corresponding to the composition map as a processing target using the gain calculated in step S1015.

The third exemplary embodiment enables correcting the gradation to provide the proper brightness to each subject region even if different subject regions exist in a composition map.

Although the above-described exemplary embodiments are based on a digital camera for personal use, the disclosure is also applicable to portable apparatuses, smart phones, and network cameras connected to a server as long as a depth composition function is provided. Alternatively, the above-described processing can be partly performed by a portable apparatus, a smart phone, or a network camera connected to a server.

The configuration of the disclosure enables control for providing proper brightness to a region to be composed in a composite image generated using a plurality of images with different focus positions.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-188453, filed Nov. 12, 2020, which is hereby incorporated by reference herein in its entirety.

What is claimed is:
1. An apparatus, comprising:
at least one memory configured to store instructions; and
at least one processor coupled to the at least one memory and configured to execute the instructions to:
perform image composition of a plurality of images with different focus positions;
calculate contrast-related values based on the plurality of images;
generate a composition map based on the contrast-related values;
divide a region based on main subject and non-main subject with respect to the plurality of images;
determine whether the composition map corresponds to the region of the main subject or the non-main subject;
obtain different target luminance values based on a result of photometric measurement on the main subject and the non-main subject; and
calculate a gain for correcting a gradation, based on the different target luminance values for a background subject.

2. The apparatus according to claim 1, wherein the at least one processor further executes the instructions to correct luminance for the divided region to provide proper luminance.

3. The apparatus according to claim 1, wherein the at least one processor further executes the instructions to divide the region based on the composition map.

4. The apparatus according to claim 3, wherein the at least one processor further executes the instructions to divide, in a case where a plurality of subjects exists in the composition map corresponding to one of the plurality of images, each of the plurality of subjects into different regions.

5. The apparatus according to claim 1, wherein the at least one processor further executes the instructions to divide a main subject region and a non-main subject region.

6. The apparatus according to claim 1, wherein the at least one processor further executes the instructions to change, when correcting a first image of the plurality of images, a correction amount for correcting the first image based on whether a second image adjacent to the first image has been used for the image composition.

7. An apparatus, comprising:
a sensor configured to capture a plurality of images with different focus positions;
at least one memory configured to store instructions; and
at least one processor coupled to the at least one memory and configured to execute the instructions to:
perform image composition of the plurality of images;
calculate contrast-related values based on the plurality of images;
generate a composition map based on the contrast-related values;
divide a region based on main subject and non-main subject with respect to the plurality of images; determine whether the composition map corresponds to the region of the main subject or the non-main subject;
obtain different target luminance values based on a result of photometric measurement on the main subject and the non-main subject; and
calculate a gain for correcting a gradation, based on the different target luminance values for a background subject.

8. A method, comprising:
performing image composition of a plurality of images with different focus positions;
calculating contrast-related values based on the plurality of images;
generating a composition map based on the contrast-related values;
dividing a region based on main subject and non-main subject with respect to the plurality of images;
determining whether the composition map corresponds to the region of the main subject or the non-main subject;
obtaining different target luminance values based on a result of photometric measurement on the main subject and the non-main subject; and
calculating a gain for correcting a gradation, based on the different target luminance values for a background subject.

9. The method according to claim 8, further comprising dividing the region based on the composition map.

10. The method according to claim 8, further comprising dividing a main subject region and a non-main-subject region.

11. The method according to claim 8, further comprising changing, when correcting a first image of the plurality of images, a correction amount for correcting the first image based on whether a second image adjacent to the first image has been used for the image composition.

12. A non-transitory computer-readable storage medium, which stores a computer program for causing a computer to execute a method, the method comprising:
composition of a plurality of images with different focus positions;
calculating contrast-related values based on the plurality of images;
generating a composition map based on the contrast-related values;
dividing a region based on main subject and non-main subject with respect to the plurality of images;
determining whether the composition map corresponds to the region of the main subject or the non-main subject;
obtaining different target luminance values based on a result of photometric measurement on the main subject and the non-main subject; and
calculating a gain for correcting a gradation, based on the different target luminance values for a background subject.

13. The non-transitory computer-readable storage medium according to claim 12, further comprising dividing the region based on the composition map.

14. The non-transitory computer-readable storage medium according to claim 12, further comprising dividing a main subject region and a non-main subject region.

15. The non-transitory computer-readable storage medium according to claim 12, further comprising changing, when correcting a first image of the plurality of images, a correction amount for correcting the first image based on whether a second image adjacent to the first image has been used for the image composition.

16. The apparatus according to claim 7, wherein the at least one processor further executes the instructions to correct luminance for the region to provide proper luminance.

17. The apparatus according to claim 7, wherein the at least one processor further executes the instructions to divide the region based on the composition map.

18. The non-transitory computer-readable storage medium according to claim 12, further comprising dividing the region based on the composition map.

* * * * *